Figure 1:
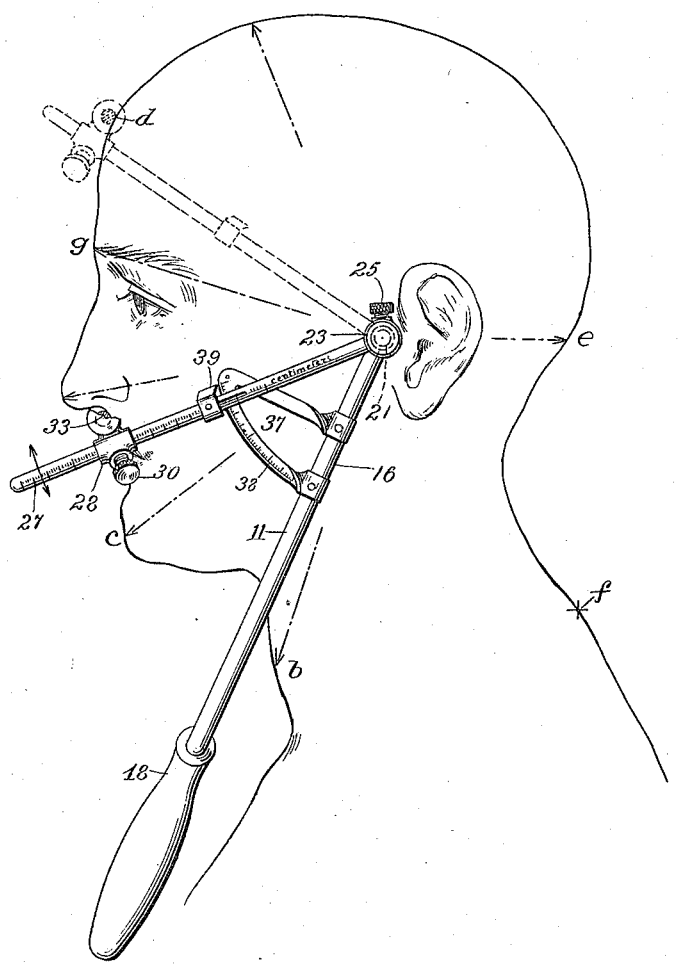

F. E. MILLER.
MEASURING INSTRUMENT.
APPLICATION FILED JUNE 30, 1914.

1,161,504.

Patented Nov. 23, 1915.
3 SHEETS—SHEET 1.

Witnesses:
F. Jackson

Inventor
Frank E. Miller
By his Attorney
Geo. L. Wheelock

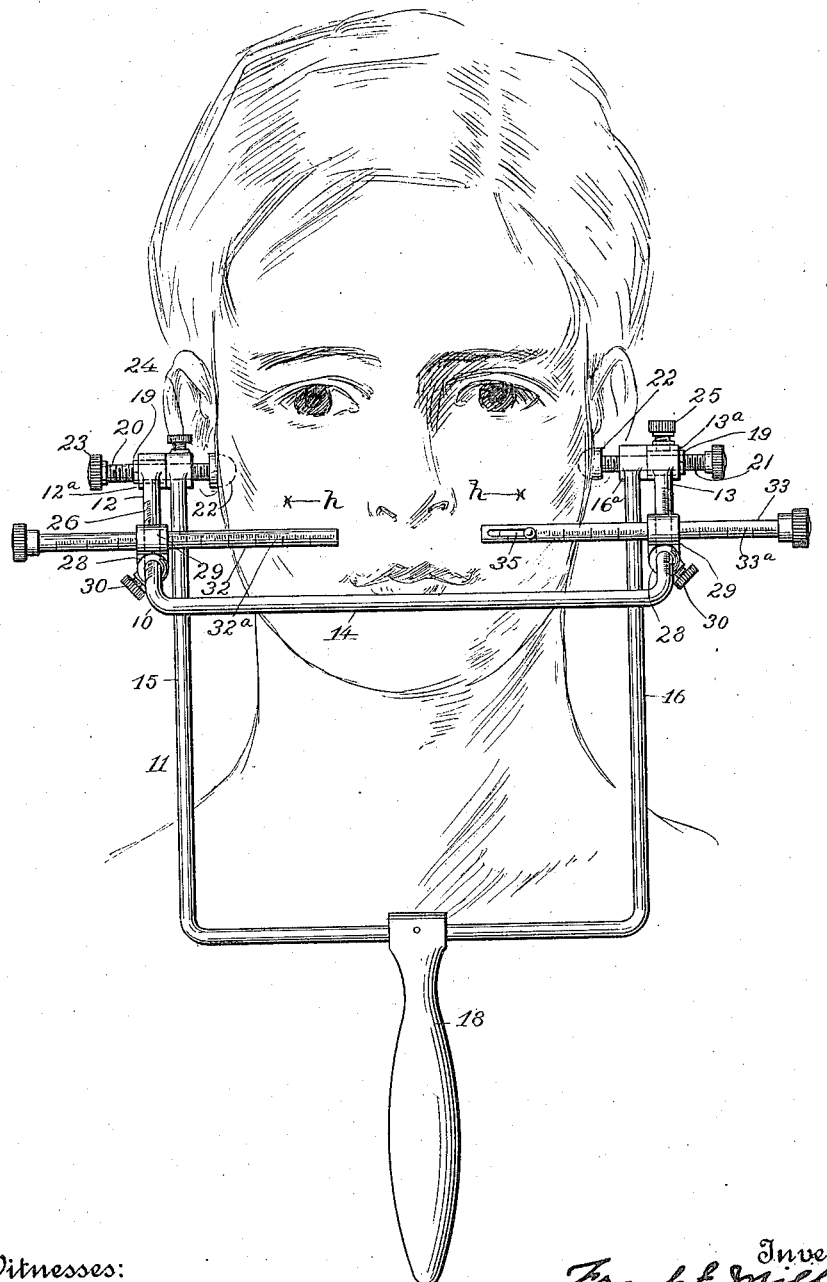

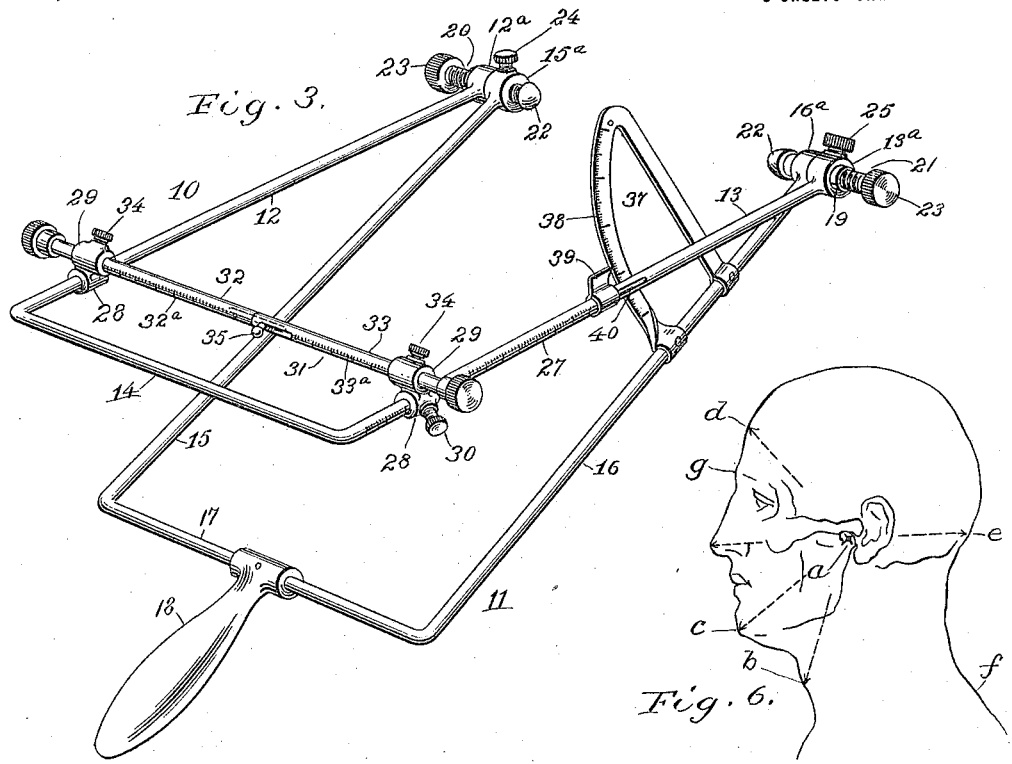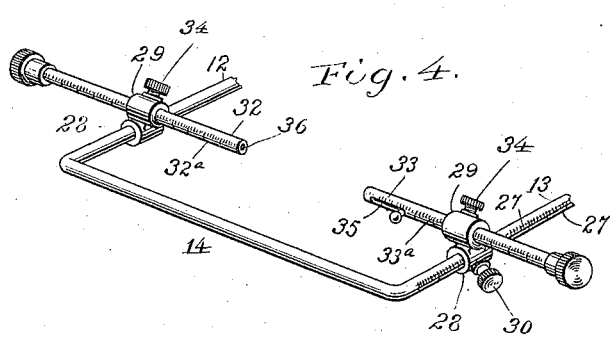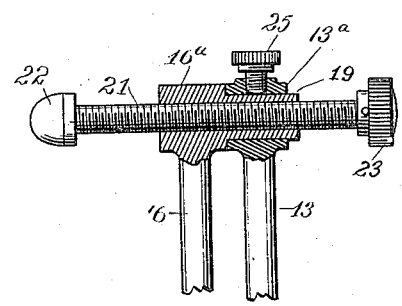

UNITED STATES PATENT OFFICE.

FRANK E. MILLER, OF NEW YORK, N. Y.

MEASURING INSTRUMENT.

1,161,504.  Specification of Letters Patent.  Patented Nov. 23, 1915.

Application filed June 30, 1914. Serial No. 848,154.

*To all whom it may concern:*

Be it known that I, FRANK E. MILLER, a citizen of the United States, residing at New York, borough of Manhattan, county and State of New York, have invented certain new and useful Improvements in Measuring Instruments, of which the following is a specification.

This invention relates to a measuring instrument more particularly adapted for measuring the human head, and the instrument is comparable with a craniometer, although the instrument has a much wider field.

An important object of the invention is to obtain head measurements whereby the resonance possibilities of a person may be ascertained, more particularly from a singing as well as other vocal standpoints, without reference to the resonance of other parts of the person from the same standpoint.

I have found in practice that the possibilities of one's voice from a singing standpoint especially, may be calculated by making certain measurements of the head and adjacent parts.

With this and other ends in view, it is the aim of the present invention to provide a simple, practical and efficient measuring instrument, whereby such head measurements as may be desired can be taken.

These being among the objects of the present invention, the same consists of certain features of construction and combinations of parts to be hereinafter described and then claimed with reference to the accompanying drawings illustrating a desirable embodiment of the invention, and in which—

Figure 1 is a side elevation showing a human head with the improved instrument applied for taking certain measurements; Fig. 2 is a front elevation of a human head showing the instrument applied; Fig. 3 is a perspective view of the improved instrument; Fig. 4 is a detail perspective view of a portion of the instrument showing a different adjustment than in Fig. 3; Fig. 5 is an enlarged detail section of the parts adjacent the centering point; and Fig. 6 is a side elevation of a human head on which are indicated various points and angles of measurements.

Referring to the drawings, it will be seen that preferably the instrument comprises mainly two frames 10, 11. As seen from Fig. 3, the frame 10 is of U-shape and comprises two parallel arms or bars 12, 13 and a transverse connecting bar or rod 14. The frame 11 is shown of somewhat similar shape and comprises two parallel bars or rods 15, 16, which constitute two arms of the frame 11, joined by a connecting bar 17. As will be clear from Fig. 1, the frame 11 is longer than the frame 10, and is preferably provided with a handle 18 so that said frame 11 constitutes a handle member.

Referring to Figs. 2 and 3, it will be seen that the ends of the arms of said frames are pivoted at corresponding centers, to enable which the arms of the frame 10 are terminated by collars $12^a$, $13^a$, and the corresponding ends of the arms of frame 11 by collars $15^a$ and $16^a$. Preferably each of the collars $15^a$, $16^a$ is split and provided with a split sleeve such as 19. The said collars $15^a$ and $16^a$ and said sleeves 19 are internally screw-threaded and receive screw-threaded pins or pivot pins 20, 21, there being a pair of such pivot pins, one at each side of the instrument. Each of said pivot pins is provided at the inner end with a suitable centering point such as 22, which may be shaped in any suitable fashion, but is preferably convexed as shown so as to be pressed against the head without injury. Each of said pivot pins is furthermore provided at its outer end with a milled head such as 23 by which the said screw-threaded pivot pins may be turned and adjusted longitudinally in the ends of the frame 11. Obviously the heads 23 may be made removable. Pin $23^a$ may to that end be driven out from the head and pivot 20 or 21.

By further reference to Fig. 5, it will be seen that each of the collars of the frame 10 may be slipped onto the sleeves 19 of the other frame, so that a pivot connection between said frames will be provided. To set the said frames to a definite adjusted angular position with respect to each other, one arm of the frame 11 may be provided with a set screw 24 which may be screwed tight against the corresponding pivot pin, while the arm 13 of frame 10 at the opposite side of the instrument may, as shown in Fig. 5, be provided with a set screw 25, which may be screwed home against the sleeve 19. It will be seen therefore that the opposite pivot pins may be set toward or away from each other and that the two frames may be set to a definite angular position by means of set screws 24, 25.

Each of the arms or bars of the frame 10 is lengthwise graduated according to any desired unit of measurement such for instance as centimeters, as shown at 26, 27, so that each of said arms constitutes a measuring bar. These measuring bars or arms are suitably connected together by an adjustable cross rod or gage as will now be described. Referring more particularly to Figs. 3 and 4, each of said bars or arms 12, 13 of the frame 10 carries a mounting which comprises a sleeve or guide 28 through which its corresponding arm passes, while connected with said sleeve so as to extend at right angles thereto is a second sleeve or guide 29. The sleeves such as 28 constitute indicators, either end of which as desired may be set opposite the graduations on the measuring arms or bars and may be firmly secured in adjusted position by means of set screws 30. The sleeves such as 29 on each measuring bar or arm 12, 13, extend in alinement with each other, and mounted therein is a transverse rod 31 constituting a gage. Said gage may, as shown, comprise two associated gages 32, 33 which may be adjusted longitudinally in the sleeves such as 29 so as to space them at a greater or less distance apart, and they may be fixed in their adjusted position by means of set screws such as 34. Also the said two gages 32, 33 may be connected together so as to constitute but one gage, by means of a sliding-locking pin at 35, which pin may be provided with suitable actuating means and mounted in the inner end of one of said associated gages, while the inner end of the other of said gages may be provided with a longitudinal bore or hole 36 to receive said pin and unite the said associated gages into one gage as shown in Fig. 3. Each of the associated gages 32, 33, is provided with a longitudinal series of graduations 32ª, 33ª, respectively, which may be set opposite any desired end of the sleeves 29 so that a measurement transversely of the frame 10 may be taken.

Referring more particularly to Figs. 1 and 3, a member 37 is shown as attached to the frame 11 or handle member, and preferably the said member 37 is made as a quadrant and is provided with a longitudinal series of graduations 38 extending along its curved side, the curve of which latter is concentric with the pivotal point of the two frames. Mounted on the frame 10 is a pointer or indicator 39 which is adapted to be set opposite the graduations of the member 37, and preferably the said pointer has a tongue and groove connection at 40 with said frame 10. It will be seen that by means of a graduated member and pointer such as 37 and 39, the angularity of the adjustment of the two frames may be determined.

The improved measuring instrument may be used as follows: Assuming that the resonance of the concavities of the head is to be determined by a physician or vocal teacher, the instrument if it be in the form of a frame as shown, is placed over the face until the desired points for centering the instrument as upon pivots are determined. These points I have selected at the opposite condyles as indicated at $a$, Fig. 6. These points lie just in advance of the ears and in a line with the nose. It is obvious that other center points may be taken, as for instance the meatii of the ears. The pivot pins 21 are then screwed inwardly until their inner centering points 22 press suitably against the fleshy parts, sufficient to provide a pivot point for the frames which constitute swinging members. It will be seen by reference to Fig. 1 that the frame 10 may be swung entirely around the head from front to rear with the condyles as centers. Assuming that a measurement from the tip of the nose to the condyles is to be taken, the frame 10 or measuring bar is moved so that it will extend between the condyles and the tip of the nose, and then the gage 33 is adjusted in apparent manner along the frame 10 or measuring bar until it just touches the tip of the nose. The graduations on the measuring bar or frame 10 will indicate the measurement desired. To obtain this and other measurements, the set screw 25 which holds the frame 10 or measuring bar should be loosened so that the same may pivot with respect to the frame 11 which constitutes a holding member, the handle 18 being grasped to hold the centering points 22 opposite the condyles. The frame 10 or measuring bar may now be swung so as to measure other distances from the condyles. The usual points for contact of the gage 31 are indicated more particularly in Fig. 1. In measuring for resonance of the chambers of the head and neck, the points of contact would be at $b$ which indicates the thyroid cartilage, at $c$ for the mental process, at $d$ for the frontal eminence, at $e$ for the occipital protuberance, and at $f$ for the fifth cervical vertebra. It will be seen therefore that by swinging the frame or measuring bar 10 around the condyles as a center and adjusting the gage 33, the distance from the thyroid cartilage, the mental process, the tip of the nose, the frontal eminence, the occipital protuberance, and the fifth cervical vertebra to the condyles may be measured. These measurements may be read off from the scales on the frame 10. So much for lineal measurement with respect to the condyles.

Angular measurements may be taken as for instance from the thyroid cartilage to the mental process, including the condyles in the angle, and likewise from the mental process to the tip of the nose or from the tip of the nose to the frontal eminence, as well as from the border of the upper lip to the frontal sinus at $g$. The angular measurement is read from the graduated member or scale 38, opposite which the pointer or indicator 39 is set. The manner of making these angular measurements may be well seen from a determination of the amount of the opening of the jaws to their fullest capacity. The gage is set against the underside of the lower lip with the pointer 39 at zero, in which case the handle member will be depressed. The lower jaw being now moved to its fullest extent, the pointer will be moved along the scale 38, from which the amount of the jaw opening can be read.

The associated gages 32 and 33 are disconnected and properly adjusted for measuring transverse dimensions of the head. Such a dimension, and which is important in determining resonance of the internal head concavities, extends from cheek to cheek at those points where the jaw muscles are attached or rather from the levator anguli oris on one side of the face to that on the opposite side, which points are indicated at $h$ in Fig. 2. To obtain this measurement obviously the gages 32 and 33 must be adjusted toward the pivotal point of the instrument, and the same adjusted longitudinally so that they may be placed at the points for the measurement which was stated.

The instrument of the present invention will not only find its use by physicians, vocal teachers, boards of education and the like, but will be useful in the Bertillon system, in phrenology, and otherwise.

Obviously the invention is susceptible of a wide range of modification, as parts may be omitted, parts added and parts substituted, and the parts differently operated without departing from the scope of the invention as expressed in the claims.

What I claim as new is:—

1. In a measuring instrument, the combination of a two-armed frame provided with opposing centering pivots, said arms extending at substantially right angles to the axes of said pivots for a distance which is at least as great as the distance from the common axis of the condyles of the jaws to the frontal eminence of the human head, and one at least of said arms having a series of graduations, which graduations are substantially parallel with said pivot axes for a distance equal at least to said measurement of the head, and a gage connected with the said graduated arm and being adjustable to a plurality of positions parallel with said pivot axes.

2. In a measuring instrument, the combination of a frame provided with opposing centering points, said frame having a series of graduations, which extend along a portion thereof which extends at right angles to the axes of said points for a distance which is at least as great as the distance from the common axis of the condyles of the jaws to the frontal eminence of the human head, and a gage connected with the said graduated portion of said frame, said gage being adjustable longitudinally of said graduated portion, and being parallel with the axes of said centering points in its various adjusted positions along the length of said head measurement, and being itself graduated and adjustable longitudinally.

3. In a measuring device, the combination of a frame comprising a measuring bar or arm and provided with opposing centering points, which bar or arm is of a length corresponding at least to the shortest distance between an imaginary straight line connecting the condyle points of the jaws of the human head and the frontal eminence thereof, a mounting comprising two guides, arranged one transverse of the other, one of said guides being fitted adjustably to said measuring bar or arm, and movable in a direction away from and at right angles to the common axis of said centering points, at least to a distance corresponding with that of the extent of said length, so that the other guide is substantially parallel with said axis, and a gage fitted for longitudinal adjustment to the last named guide, and extending transversely of said bar or arm so that it is adjustable along a line parallel with said axis, said gage being graduated and adjustable by said first named guide to a plurality of positions which are always parallel with said axis.

4. In a measuring instrument, the combination of a frame having sides with opposing centering points, and devices supported at said sides of said frame for measuring an angular distance laterally from the axes of said points and comprising mutually opposed means for measuring a width substantially parallel with said axes, the said opposite sides of said frame extending at right angles to the common axis of said points for a distance which is at least as great as the distance from the common axis of the condyles of the jaws to the frontal eminence of the human head.

5. In a measuring instrument, the combination of a frame having two graduated arms and provided with opposing centering points, said arms extending from said points, parallel with each other, for a distance which is at least as great as the distance from the common axis of the condyles of the jaws to the frontal eminence of the human head, and a pair of longitudinally adjustable gages, one mounted transversely on each graduated arm of said frame, and both adjustable transversely of said arms, always to a position parallel with said centering points, and said gages being adapted to be alined and, when alined, mutually opposing each other so that the distance to which said gages are separated may be ascertained by a single measurement.

FRANK E. MILLER.

Witnesses:
 FLORENCE H. AIKEN,
 SARAH R. ROTHER.

Copies of this patent may be obtained for five cents each, by addressing the "Commissioner of Patents, Washington, D. C."